United States Patent [19]
Hayashi

[11] 3,877,563
[45] Apr. 15, 1975

[54] AUTOMATED TRANSFER APPARATUS
[76] Inventor: Torahiko Hayashi, 2-3 Nozawa-cho, Utsunomiya, Japan
[22] Filed: Sept. 13, 1972
[21] Appl. No.: 288,642

[30] Foreign Application Priority Data
Sept. 14, 1971 Japan .................................. 46-71520

[52] U.S. Cl. .......... 198/31 AB; 198/20 R; 198/31 R; 198/34; 214/6 DK
[51] Int. Cl. ............................................. B65g 47/26
[58] Field of Search ............ 214/6 DK; 198/34, 223, 198/20, 24, 31

[56] References Cited
UNITED STATES PATENTS

| | | | |
|---|---|---|---|
| 2,409,478 | 10/1946 | Dickow | 198/223 |
| 2,794,534 | 6/1957 | Forrester | 198/34 |
| 3,297,129 | 1/1967 | Lesch | 198/20 R |
| 3,429,458 | 2/1969 | McWilliams | 198/24 |
| 3,517,833 | 6/1970 | Shaffer | 214/6 DK |
| 3,651,962 | 3/1972 | Arnemann | 214/6 DK |
| 3,667,628 | 6/1972 | Gabler | 214/6 DK |

FOREIGN PATENTS OR APPLICATIONS
1,343,422 10/1963 France .............. 214/6 DK Primary Examiner—Evon C. Blunk
Assistant Examiner—Jeffrey V. Nase

[57] ABSTRACT

An automated apparatus for transferring materials from one conveyor means to a second conveyor means so as to align the materials into a plurality of rows or lines on said second conveyor means comprising a first conveyor means provided with a roll at an end thereof periodically oscillatable in vertical directions so as to control the number or the spacing of objects to be picked up by said first conveyor means, a push means for pushing materials on said conveyor means operatable in response to signals emitted in accordance with the number of oscillations of said roll, a receiving plate for receiving materials pushed by said push means, positioned adjacent to said conveyor means and retractable away from said conveyor means, a baffle plate positioned immediately above said receiving plate spaced apart from the end of said receiving plate opposite to said conveyor means so as to permit said receiving plate to receive materials from said conveyor means, a second conveyor means moving crosswise underneath said first conveyor means and means to retract said receiving plate abruptly so as to cause the materials to hit said baffle plate and fall onto the second conveyor means.

4 Claims, 8 Drawing Figures

AUTOMATED TRANSFER APPARATUS

This invention relates to an apparatus for transferring materials from one conveyor means to another. More particularly, it relates to an automated apparatus designed for rearranging objects conveyed on one conveyor means in a single straight line into a plurality of lines or rows at desired intervals by transferring them from the conveyor means to a different conveyor means.

It is often necessary or advantageous in the production of confectionery, bread and other similar articles to transfer objects under processing from one production line to a tray, box and other container for further handling or to a different processing station with the objects in a different positional arrangement, particularly in rows.

Heretofore, such an operation has been conducted by pushing one or more objects on one conveyor means and dropping them onto a different conveyor means running underneath the first conveyor means transversely. If a plurality of objects are dropped simultaneously, rows of objects are formed on the second conveyor means. The above operation is not satisfactory on many occasions because the dropping of objects by pushing often causes the objects to turn upside down when they fall or to roll on the second conveyor means, thus resulting in a irregular positioning of the objects on the second conveyor means. If the velocity of the push means is increased, objects tend to fall in arcuate motions, thereby increasing the tendency towards irregular positioning.

The present invention aims at eliminating the above defects and enabling precise positioning of objects in a plurality of rows or lines in a tray or other container on the second conveyor means or directly on said conveyor. The present invention provides an automated transfer machine comprising a first conveyor means, a push means for pushing objects on said conveyor means, a receiving plate for receiving objects pushed by said push means, positioned adjacent to said conveyor means and retractable away from said conveyor means, a baffle plate positioned immediately above said receiving plate spaced apart from the end of said receiving plate opposite to said conveyor means so as to permit said receiving plate to receive objects from said conveyor means, a second conveyor means moving underneath said first conveyor means in the crosswise direction and means to retract said receiving plate abruptly so as to cause the objects to hit said baffle plate and fall onto the second conveyor means.

Further, the present invention may comprise a rotatable roll at an end of said first conveyor means periodically oscillatable in vertical directions so as to control the number or the spacing of objects to be picked up by said first conveyor means, a push means operable in response to signals emitted in accordance with the number of oscillations of said roll, a receiving plate for receiving objects pushed by said push means positioned adjacent to said first conveyor means and retractable away from said first conveyor means, a baffle plate positioned immediately above said receiving plate spaced apart from the end of said receiving plate opposite to said first conveyor means so as to permit said receiving plate to receive objects from said first conveyor means, a second conveyor means moving underneath said first conveyor means in the lateral direction and means to retract said receiving plate abruptly so as to cause the objects to hit said baffle plate and fall onto the second conveyor means.

In one of the aspects of the present invention, it comprises a push means substantially in the form of a rod rotatably and slidably supported near its upper end by a fulcrum and provided with a push plate at its lower end and a lateral projection in its middle portion and arranged to swing about the fulcrum by the action of a rotatable crank whose pin is connected to a longitudinal slot provided in the middle portion of said push means in such a manner that said pin is movable only in the longitudinal direction, said lateral projection being arranged to engage a horizontal guide plate near the middle portion of said push means when said lateral projection is lowered by said crank, thereby modifying the locus of movement of the lower end of said push plate to become substantially horizontal.

Thus, an object of the present invention is to provide an automated apparatus for the transfer of objects from one conveyor means to another thereby rearranging the positioning of the objects efficiently and with precision.

The above, and other objects, features and advantages of the invention will be apparent in the following detailed description of illustrative embodiments thereof which is to be read in connection with the accompanying drawing wherein.

Figure 1:
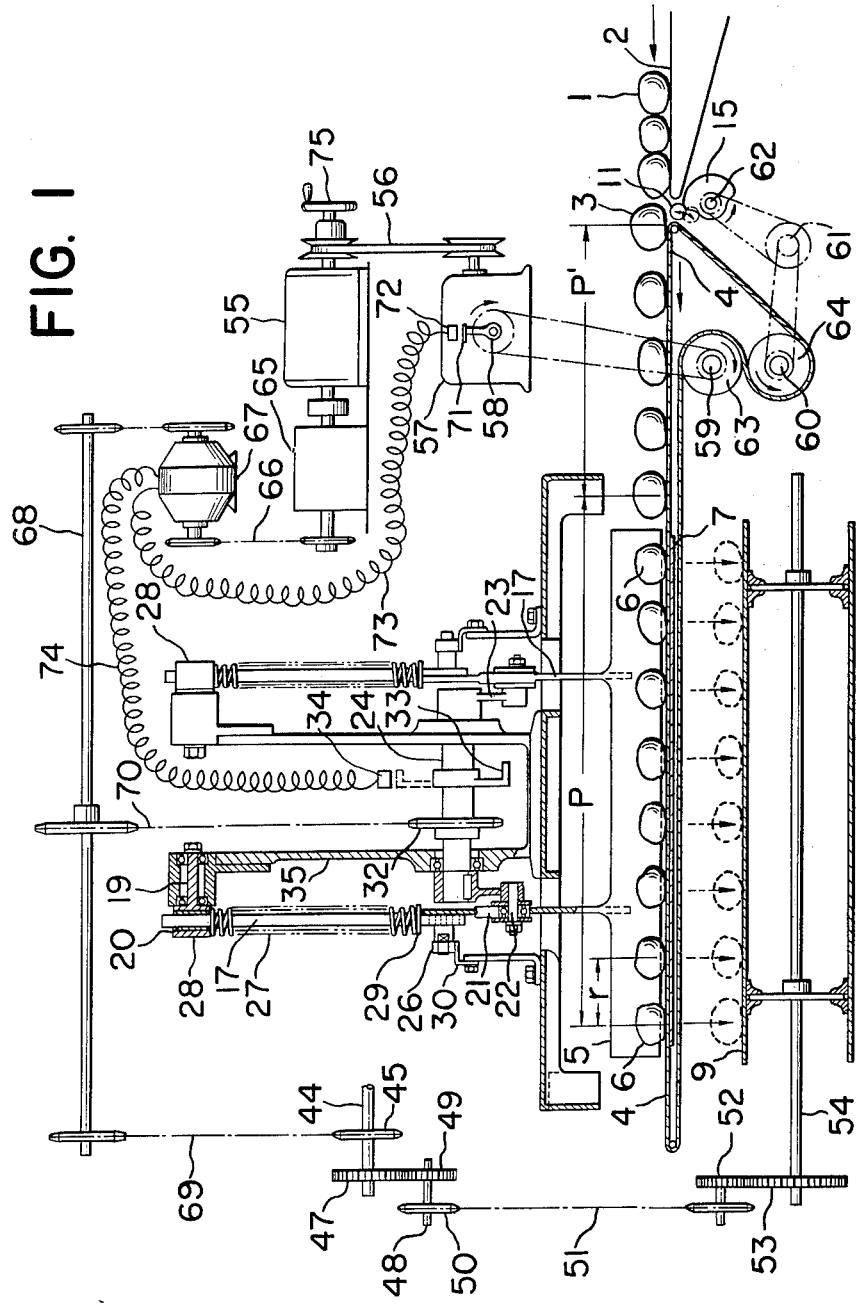
FIG. 1 is a schematic front view of an embodiment of the present invention.
Figure 2:
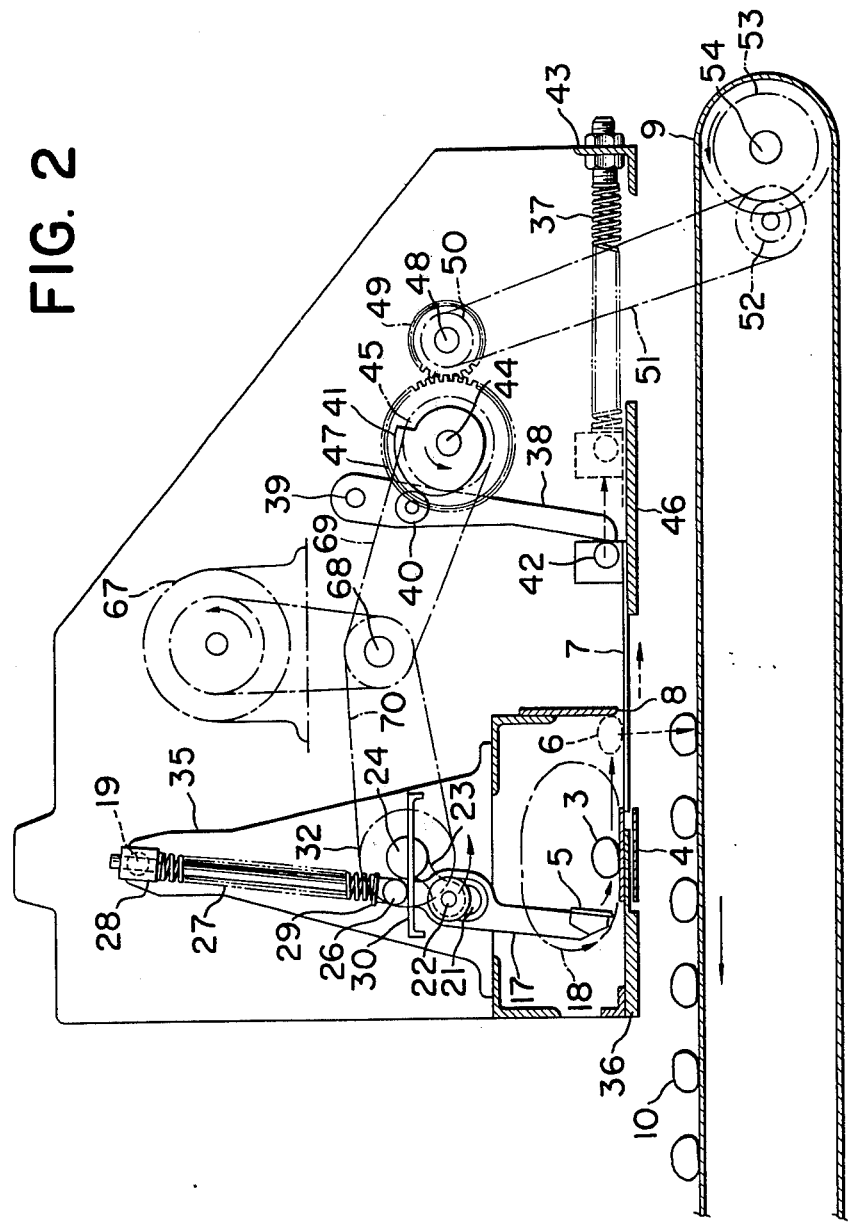
FIG. 2 is a schematic side view thereof corresponding to FIG. 1.

Referring to the drawings wherein like reference numerals designate identical or corresponding parts throughout the several views, the objects to be conveyed 1 are fed on a feeding conveyor 2.

Figure 3:
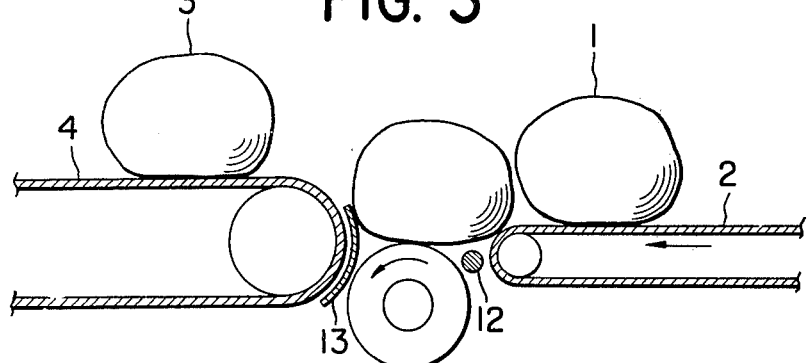
FIGS. 3 and 4 are similar views illustrating the operation of the mechanism at an end of the feeding conveyor, respectively at times the rotating body is lowered and elevated.
Figure 4:
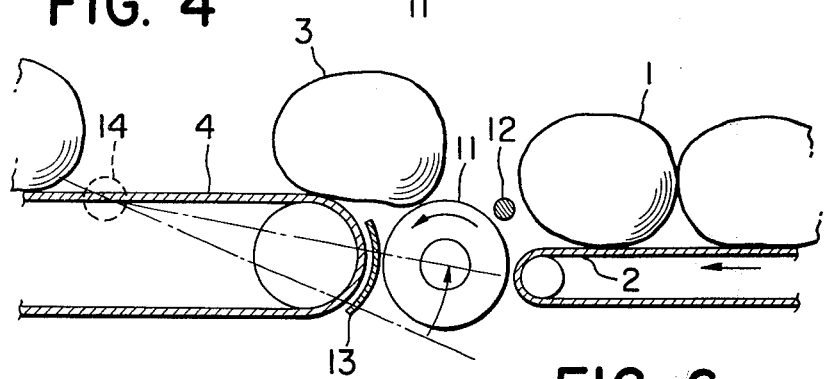

According to an embodiment of the present invention, as illustrated in FIGS. 3 and 4, a rotating body (A) 11 is placed between the feeding conveyor 2 and a receiving conveyor 4. A first shield member 12 is fixed relative to the rotating body (A) 11. The rotating body 11 is mounted to oscillate by any conventional means. A second shield member 13 is fixed relative to the receiving conveyor 4 adjacent to an end thereof so as to embrace a portion of the belt in contact with the roll 76.

A cam 15 causes the rotating body (A) 11 and the first shield member 12 to oscillate around a fulcrum 14 in vertical directions.

The objects 1 conveyed on the feeding conveyor 2, if unevenly fed thereon, are evenly spaced and transferred onto the receiving conveyor 4 through the operation of the mechanism comprising 11 through 15 abovementioned, and the number of objects thus transferred can be computed by the number of oscillations of this rotating body. Namely, as shown in FIG. 4, in case the rotating body (A) 11 is elevated, the first shield member 12 is elevated at the front of the discharging point of the feeding conveyor, thereby preventing the object 1 from progressing. In case, as shown in FIG. 3, the rotating body is lowered, the first shield member is placed below the level of the discharging point of the feeding conveyor 2, thereby allowing the object 1 to be transferred onto the rotating body. But the second shield member 13 bars the object 1 from being transferred onto the conveyor 4. Subsequently, when the rotating body (A) 11 is raised, the object is raised thereby and is transferred over the second shield member 13 onto the conveyor 4. In the course of the abovementioned process, one elevation of the rotating body (A) 11 causes one object to be transferred onto the conveyor 4, and the blocking of the progress of the objects conveyed, alternately conducted by the first shield member 12 and the second shield member 13 through the vertical movements of the rotating body (A) 11, precisely arranges the spaces between the objects conveyed.

Figure 6:
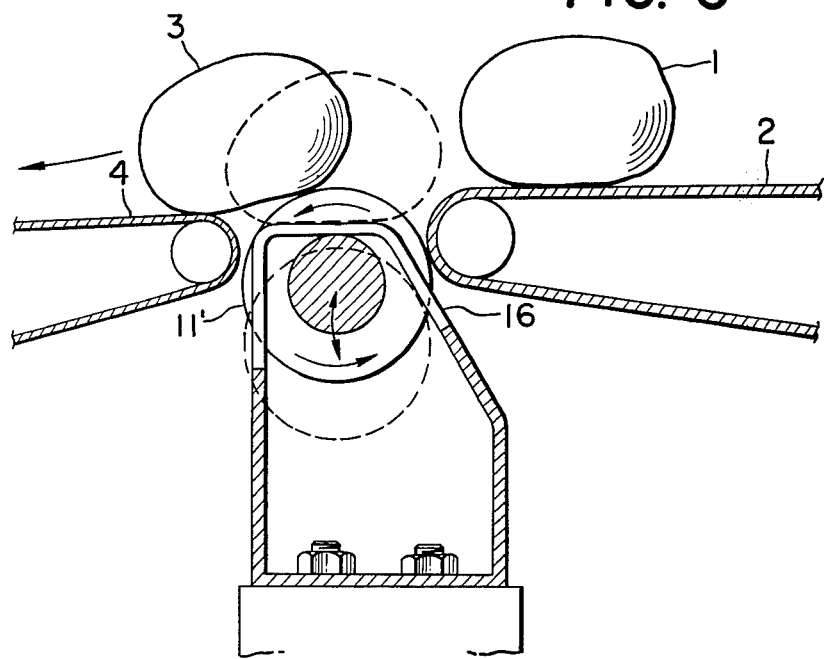
FIG. 6 is a schematic side view illustrating the operation of a mechanism as shown in FIG. 5.
Figure 5:
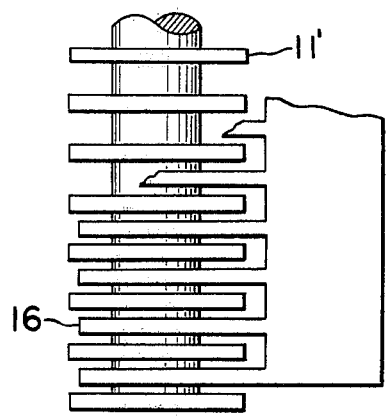
FIG. 5 is a plan view of part of a mechanism similar to that as shown in FIGS. 3 and 4.

Similarly, a rotating body (B) 11', as illustrated in FIGS. 5 and 6, has the function of arranging the number of, and the spaces between, the objects 3 conveyed on the conveyor 4. The rotating body (B) 11' has grooves on its circumferential surface, and the protrusions defined by adjacent grooves can pass through the openings of a striped net 16. The rotating body 11' is mounted to oscillate by any conventional means, such as a cam follower and cam. In case the rotating body (B) 11' is raised, as shown in FIG. 6, the protrusions of the rotating body protrude upwardly through the openings of the net 16, and cause the object 1 to be transferred onto the conveyor 4, while, in case the rotating body (B) 11' is lowered, the object rests on the net 16. Repetition of this process has the same effect as the vertical movements of the rotating body 11 as shown in FIGS. 3 and 4.

In an embodiment shown in FIGS. 3 and 4, in case the object conveyed has the stable bottom, the first and second shield members 12, 13 may be eliminated and the same objective can be attained by making the distance from the level of the discharging point of the feeding conveyor 2 to that of the receiving point of the receiving conveyor 4 to be larger than the radius of the roll 76.

An arm 17 causes a push plate 5, fixed thereto at the lower end thereof, to move on an elliptical locus 18, and the upper portion of the arm passes through an opening in a thrust metal 20, having an axis which perpendicularly intersects the axis of a fulcrum shaft 19. In the middle portion of the arm 17 is an elliptical slot 21 in which is inserted the crank pin 22 of a crank 23, which pin has a locus illustrated in FIG. 7 with the reference number 25. A roll 26 is provided in the intermediate portion of the arm 17, and may be positioned above or below the elliptical slot 21. A spring 27 is inserted between the lower end of the case 28 of the thrust metal 20 and an intermediate protrusion 29 in the middle of the arm 17, and continuously presses the arm 17 downwards. A rail 30 is provided to guide the roll 26, and changes the lower portion of an otherwise circular locus of the roll 26 to a straight line. As the result, the roll 26 is forced to follow a locus 31 when it is operated by the crank 23, the fulcrum 19 and the thrust metal 20. Consequently, the push plate 5 is forced to follow a locus 18 parallel in part to the surface level of the conveyor 4. When the roll 26 moves along the straight line in the lower portion of its locus, the arm 17 is raised for a short time by the coaction of the roll 26 and the rail 30, and thus the elliptical orifice 21 is formed so as to absorb the deviation of the locus 31 of the roll 26 from the locus 25 of the crank pin 22. To the shaft 24 of the crank 23 are fixed an input sprocket 32 thereof and a signal plate 33 which transmits an electric signal ordering the stoppage of the shaft 24 by approaching an approach sensing switch 34 once per one revolution of the shaft 24.

The directions of movement the push plate 5 in this embodiment are perpendicular to the direction of movement of the conveyor 4. However, they need not always be perpendicular.

The receiving plate 7 should be placed adjacent to the conveyor 4, at the same level as, or somewhat below the level of, the upper flight of the conveyor 4.

Figure 7:
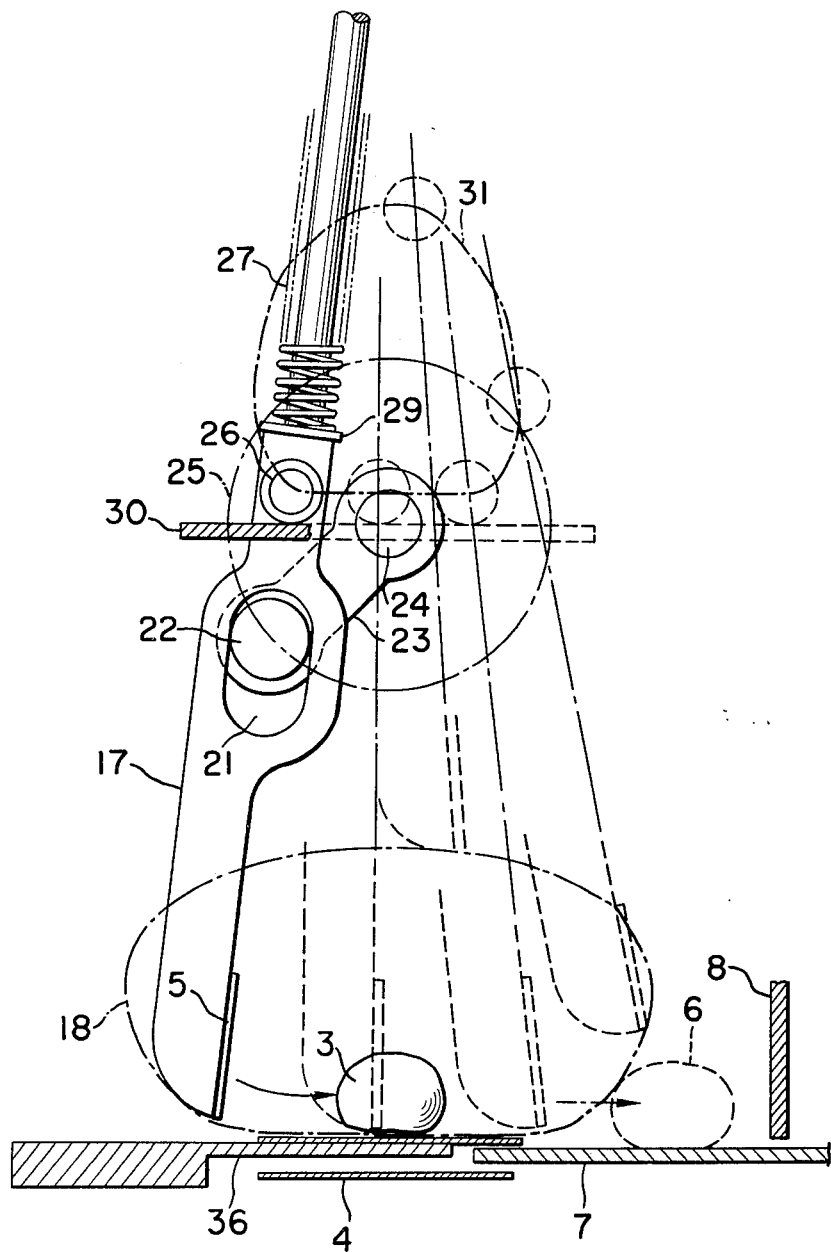
FIG. 7 is a similar view illustrating the operation of the push device of this invention.

In this embodiment, it is positioned lower than the upper surface of the upper flight of the conveyor 4 by the thickness of the belt and the forwardmost end of the receiving plate 7 slightly overlaps the upper flight of the conveyor 4. Accordingly, a supporting plate 36 for the belt in the upper flight portion of the conveyor 4, as shown in FIG. 7, is recessed so as to allow the receiving plate 7 to underlie the belt.

Figure 8:
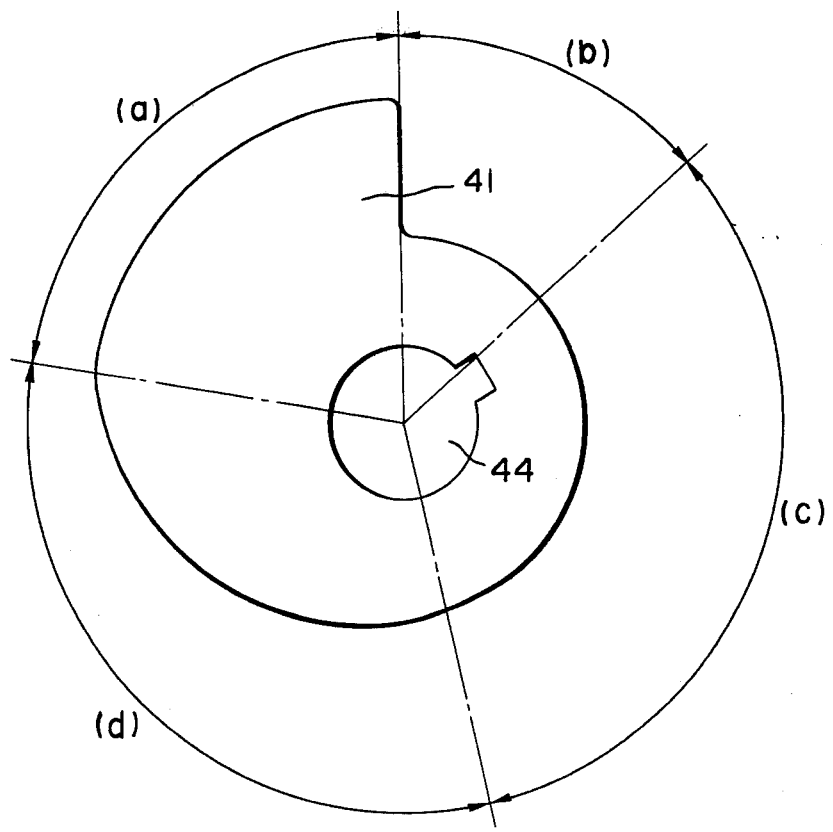
FIG. 8 is a similar view illustrating the function of each portion of the curved surface of the cam controlling the movements of the receiving plate of this invention.

After the objects 6 have been transferred onto the receiving plate 7, located near or partially beneath the conveyor 4, by the push plate, the receiving plate is quickly separated from the conveyor 4 by means of a spring 37. A baffle plate 8 is positioned at an appropriate place above the receiving plate 7 and adjacent thereto, and causes the objects 6 on the receiving plate to fall down onto the transfer conveyor 9 below when the receiving plate is retracted. The receiving plate should be retracted beyond the position of the plate 8 to secure the transfer of the objects 6 to the transfer conveyor 9. A push rod 38 is rotatably fixed to a fulcrum 39. In the middle portion of the push rod 38 is provided a roll 40, which engages a cam 41. The cam 41 pushes the push rod 38 at the roll 40, thereby causing the receiving plate to progress on a rail 46. The lower end of the push rod 38 is in contact with a receiving bar 42 which is connected to a spring 37. The spring 37 in turn is connected with the rear end poriton 43 of the frame. The portions $a$, $b$, $c$, $d$ of the circumference of the cam 41, as shown in FIG. 8, conduct different functions: portion $a$ has a uniform and the largest radius so as to keep the push rod 38 at the foremost position; portion $b$ has a uniform and the smallest radius so as to instantaneously release the pressure of the push rod 38, thereby quickly retracting the receiving plate 7 by means of the spring 37; and portions $c$, $d$ have a curved cam surface whose radii gradually increase from the radius of portion $b$ to that of portion $a$. A sprocket 45 is fixed to the shaft 44 of the cam 41, and imparts input from the prime mover to the cam.

Input to the transfer conveyor 9 is, in this embodiment, taken from the shaft 44 of the cam 41. To this shaft 44 is fixed a partly toothed gear 47, which intermittently transmits the rotation to a gear 49 fixed to the counter shaft 48. Input to the gear 49 is transmitted through a sprocket 50 also fixed to the counter shaft 48, a chain 51, a gear 52 and a gear 53, to a conveyor 9, which consequently is operated intermittently. While the portion *d* of the cam 41, as shown in FIG. 8, is operating, the rotation of the partly toothed gear is transmitted to the gear 49. While the portion *b* of the cam 41 is operating, the objects 6 fall down onto the transfer conveyor 9 and the transfer conveyor is stationary.

The rotation of a motor 55 is transmitted from one end of the shaft thereof, through a stepless speed variator 56 to a reduction gear 57. From an output shaft 58 of the reduction gear 57, the output is transmitted through chains or gears, to the first shaft 59, the second shaft 60, the third shaft 61 and the fourth shaft 62. The number of revolutions of these shafts are, in this embodiment, arranged to be 2, 2, 4 and 8 respectively, while the output shaft 58 makes one revolution. To the fourth shaft 62 is fixed a cam 15 so that eight revolutions of the cam 15 i.e. eight reciprocal vertical movements of the rotating body 11 or 11' correspond to two revolutions of the first shaft 59 and the second shaft 60. To the first shaft 59 and the second shaft 60 are fixed respectively rolls 63 and 64, having the same radius, and both constituting the input rolls for the conveyor 4. Two revolutions of the rolls 63, 64 cause the belt 4 to progress a distance P, as shown in FIG. 1. Eight pieces of the objects are transferred onto the part of the belt 4 with the length of P.

The other end of the output shaft of the motor 55 is directly connected with the second reduction gear 65, whose output is transmitted through a chain 66 to a magnetic clutch 67, whose output in turn is transmitted through chains to the shaft 68. From the shaft 68 is the output transmitted, first, through a chain 69 to the sprocket 45, i.e. to the cam shaft 44, and, second, through a chain 70 to the sprocket 32, i.e. to the crank shaft 24. To the output shaft 58 of the reduction gear is fixed a start signal plate 71, whose approach is sensed by an approach sensing switch 72, and whose order is transmitted through a line 73 to the magnetic clutch 67. To the shaft 24 is fixed the stop signal plate 33, whose approach is sensed by the approach sensing switch 34, and whose start order is transmitted through a line 74 to the magnetic clutch 67.

Thus, in the automatic operations of the mechanisms above-mentioned in this embodiment, the start signal plate 71 causes the approach sensing switch 72 to operate, thereby causing the magnetic clutch 67 to operate, after every eight reciprocal vertical movements of the rotating body 11. Consequently, the push plate 5 is caused to move transversely of the running direction of the conveyor 4, transferring eight objects 6 to be conveyed onto the receiving plate 7, and to move upwards and back to the starting position, along the locus 18. This push plate 5 is stopped after each one revolution by the stop signal plate. Directly after the push plate 5 transfers the objects 3 onto the receiving plate 7, the starting point of the portion *b* of the curved surface of the cam 41 becomes contacted with the roll 40, thereby causing the receiving plate 7 to be quickly withdrawn and the objects 6 thereon to be stopped by the baffle plate 8 and to fall down onto the transfer conveyor 9. The transfer conveyor does not move while the objects fall down, and starts moving upon such transfer, allowing no substantial disorder in the alignment of the objects regulated by the baffle plate 8. As to the spaces between the objects, as shown in FIG. 1 as *p*, when the value of P is set at 70 mm, deviations are found, in experiments, to be within a range of 2 mm, in case the objects are pieces of dough for confectionery, each of which weighs 50 g, and the velocity of the conveyor 4 is 6 m per minute. Practically, this invention allows a free selection of the number of objects in a row, and a free change of a pitch *p* between the objects in accordacne thereto, by incorporating a clutch into the third shaft 61 and thereby changing the rate of revolution of the signal plate to that of the cam 15. The operation of the handle 75 of the stepless speed variator 56 enables the apparatus of this invention to adapt itself to the velocity of the objects 1, without affecting the number of objects in a row and the space *p* between the objects therein.

Although illustrative embodiments of the invention have been described in detail herein with reference to the accompanying drawings, it is to be understood that the invention is not limited to the above, and that various changes and modifications may be effected therein by those skilled in the art without departing from the scope or spirit of the invention.

What is claimed is:

1. An automated apparatus for transferring a plurality of confectionery, bread or similar materials from a row or line extending substantially longitudinally of the direction of movement of a first powered belt conveyor means to a second powered belt conveyor means so as to align said materials into a plurality of spaced rows or lines on said second belt conveyor means substantially transverse to the direction of movement of said second belt conveyor means, comprising
   a. a first powered belt conveyor means,
   b. push means for pushing materials transversely from said first conveyor means,
   c. a receiving plate for receiving said materials pushed by said push means positioned opposite said first conveyor means and retractable substantially transversely from the direction of movement of said first conveyor means,
   d. a baffle plate positioned immediately above said receiving plate spaced apart from the end of said receiving plate and opposite to said first conveyor means so as to permit said receiving plate to receive materials from said first conveyor means,
   e. a second belt conveyor means movable substantially crosswise to and positioned beneath said first conveyor means and
   f. spring-biased means to retract said receiving plate abruptly so as to cause said materials to contact said baffle plate and fall off of said receiving plate down onto said second conveyor means,
   g. whereby said materials may be disposed on said second belt conveyor means in a plurality of spaced rows or lines.

2. An apparatus according to claim 1, further comprising
   a. a push means substantially in the form of a rod rotatably and slideably supported near its upper end by a fulcrum and provided with an elongated push plate at its lower end and a lateral projection in its middle portion and arranged to swing about the fulcrum by the action of a rotatable crank,
   b. a pin for said crank connected to a longitudinal slot provided in the middle portion of said push means in such a manner that said pin is movable only in the longitudinal direction,
   c. said lateral projection being arranged to engage a horizontal guide plate near the middle portion of said push means when said lateral projection is lowered by said crank,
d. thereby modifying the locus of movement of the lower end of said push plate to become substantially horizontal.

3. Apparatus according to claim 2, additionally comprising
a. a feed conveyor belt conveying material to be fed onto said first conveyor belt,
b. drive means for said first conveyor belt,
c. a shield member fixed relative to said first conveyor belt,
d. a rotating body adapted to reciprocate vertically adjacent said shield member and operatively associated with said first conveyor belt drive means,
e. an additional shield member fixed relative to said first conveyor belt,
f. whereby said materials fed from said feed conveyor are spaced apart prior to placement on said first conveyor belt by the coaction of said shield member, said rotating body adapted to reciprocate vertically and said additional shield member.

4. Apparatus according to claim 2, additionally comprising
a. a feed conveyor conveying materials to be fed onto said first conveyor belt,
b. a rotating body adapted to oscillate vertically through a plurality of fixed members arranged in tandem and positioned between the receiving end of said first conveyor belt and said feed conveyor,
c. whereby said materials fed from said feed conveyor are spaced apart prior to placement on said first conveyor belt means by the coaction of said feed conveyor, said rotating body and said fixed members.

* * * * *